United States Patent Office 3,734,718
Patented May 22, 1973

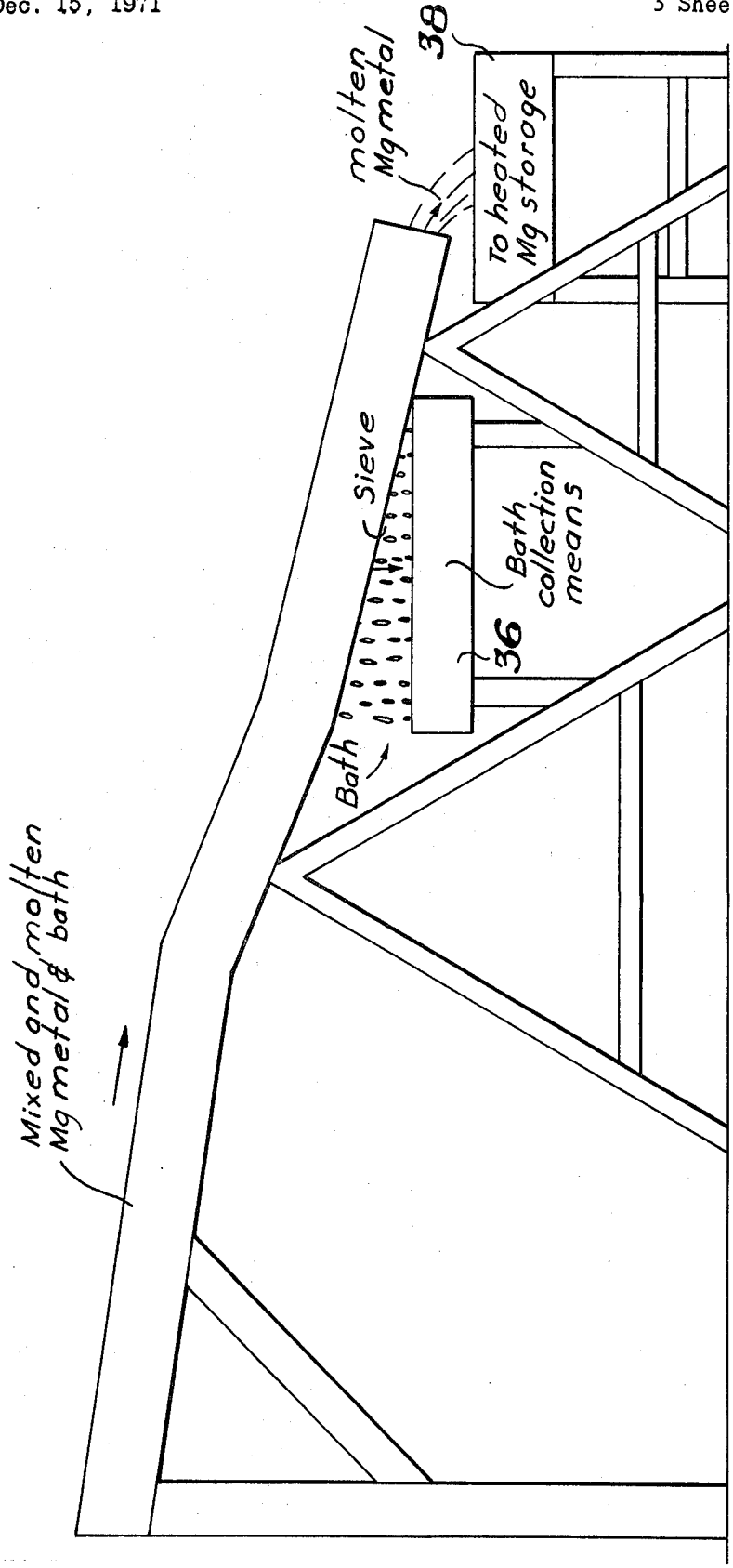

3,734,718
MAGNESIUM-MAGNESIUM CHLORIDE BATH SEPARATION
William L. Bradshaw, Lake Jackson, Tex., assignor to The Dow Chemical Company, Midland, Mich.
Filed Dec. 15, 1971, Ser. No. 208,263
Int. Cl. C22b 7/00, 45/00; B07b 1/00
U.S. Cl. 75—63      13 Claims

ABSTRACT OF THE DISCLOSURE

Magnesium metal, when removed from the electrolytic cells from which it is produced, unavoidably has an appreciable amount of electrolytic bath, also usually a small amount of particulate solid impurities (commonly called sludge) adhering to the metal. The separation of the electrolytic bath therefrom and the disposal thereof is attained by the practice of the invention which comprises, broadly, passing the mixture of molten metal and bath, together with the solid particulate sludge therein, onto a wire mesh metal screen, having openings in the range of about 2.46 mm to about 0.84 mm., whereby the bath falls through the screen and is optionally transferred onto a cooler collecting surface, preferably a portable surface where it solidifies, and the molten metal, and any particulate solid impurities present, passes on preferably into a heated holding vessel or reservoir from which molten metal is being drawn for casting.

In the preferred embodiment of the invention the molten magnesium containing sludge particles is passed onto a wire mesh sieve, having openings of from between about 2.60 mm. to about 5.60 mm., usually in the form of a basket, the sludge being retained thereon and the molten magnesium passing through to the holding vessel.

BACKGROUND OF INVENTION

Ever since the discovery of economically producing magnesium metal by electrolyzing a salt bath comprising $MgCl_2$ and other molten salts and for many years skimming by hand-held dippers the coalescent metal from the surface of the bath, and more recently pumping the metal therefrom, the problem of removing and disposing of adhering bath from the so-recovered metal has been a disturbing problem. There is also present some sludge, which herein means the insoluble solids, e.g. oxides, formed during or by contact with air following electrolysis. To avoid the bath and sludge getting admixed with the metal in casting, extensive precautions (although not fully effective) have been taken.

U.S. Pat. 3,420,658 taught the use of a perforated or foraminous plate in the removal of adhering bath. Although such plate was helpful, it failed to meet the need adequately. Experience in the use of the plate was frustrating in that the holes filmed over with bath and sludge and did not readily open when additional metal-bath/sludge mixture was passed onto the plate for separation of bath from the mixture. In practice, the separation process requires intermittant rather than continuous operation. Even where efforts were made to coat the metal of the foraminous plate with oxides or hydroxides to render it more wettable by the bath, the holes continued to film over badly between each contact with the metal-bath mixture. Various degrees of declination or dip of the screen or heights of mixture head, use of various size holes and holes arranged in staggered patterns, or the use of various materials failed to solve the problem. Thin plates appeared to offer some advantage over the thicker ones. However, if the plates were made thin enough to show an improvement, they were too weak to use. Accordingly, foraminous plate fell into disuse.

SUMMARY OF INVENTION

We have discovered that molten salt bath readily passes through a selected wire screen but that the molten magnesium does not, without the difficulties experienced with known techniques. It was unexpectedly observed that the heat capacity of the screen necessary for the invention is such that, although there is some appearance of interspersed solidified bath on the wire strands following a pour, this solidified bath promptly melts and is flushed through the screen with no difficulties whatever as soon as contacted by the ensuing pour. The wire mesh heats and cleans whereas a perforated plate remains plugged.

The invention is the method, and apparatus necessary for the practice thereof, of separating molten-magnesium metal from adhering bath which comprises passing the molten mixture of bath and magnesium onto a screen of a material substantially unreactive therewith and having a melting point above that of molten magnesium, the screen being of meshed wire, having from 3 to 8 strands per lineal centimeter (i.e. about 8 to about 20 strands per lineal inch) which provides openings of from about 2.38 mm. (although openings up to 2.46 are acceptable) to about 0.84 mm. when strands employed have diameters of from about 0.84 mm. for the widest permitted spacing to about 0.42 mm. for the narrowest spacing (such values corresponding to sieve numbers of from about 8 to about 20 inclusive, U.S. Bureau of Mines Standard Sieve Series), whereby the bath is caused to pass through the sieve openings and is properly stored or disposed of and the molten metal continues onto a molten magnesium storage facility for subsequent use or directly to be cast or employed for other product use.

There is invariably present, with the molten bath and magnesium, some sludge particles (comprising oxides). To realize the best results from the practice of the invention, the treated magnesium, after removal of the bath and prior to reaching storage, is passed through a relatively coarse sieve or screen to remove the particulate sludge. Since the sludge makes up a very small percent of the bath-magnesium mixture the use of the sludge-removing screen is not essential to successful practice of the invention.

PRACTICE OF THE INVENTION

Although any material meeting strength, relative inactivity with the molten metal and bath, and melting point requirements can conceivably be used, steel is the preferred material. Since nickel shows some reactivity with molten magnesium, high nickel alloy steels have a disadvantage. Such objection also applies to other steels containing alloying metals reactive with magnesium. However, columbium stabilized stainless steel, e.g. ASI 347 is excellent. Nickel-free stainless steels, e.g. ASI 430, are satisfactory, once fabricated and installed; but due to their greater brittleness, they offer certain fabrication and installation objections for extensive use.

The sieve or screen is so effective, that the metal-bath mixture need be in contact with it but a relatively short time. Usually a sieve size of only a few square inches performs well. The rate of flow of the metal-bath mixture may be relatively fast and the ratio of the volume of mixture to the area of screen may be quite large. A contacting interfacial area of mixture and screen of one square foot adequately separates the bath from the passing magnesium which may be as much as 3 or 4 inches deep, if the contact time across the screen is at least about 5 seconds.

The apparatus of the invention is best described as a modified trough having a part of the bottom composed of the required wire mesh screen. Preferably the trough has a plain, i.e. non-mesh, metal bottom for the first one to three feet thereof so that the heavier bath will tend to form a bottom layer, i.e. below the metal, before coming onto the screen. Usually the portion of the trough adjacent the exit end is non-mesh-metal. However, the entire bottom may consist of screen or wire mesh if deemed simpler that way, the first contact therewith in such instance being less effective than such contact a few inches or more along the screen. Under no circumstances, when following the steps of the invention, does the passage of metal through the screen (which, of course if occurring to an appreciable extent, would defeat the purpose) present a problem. Neither does filming over or any other condition arise during use to inhibit the bath from passing through the mesh screen.

Although a head of metal-bath mixture of a fraction of an inch, but preferably two or three inches, insures movement along a horizontal trough, at 0° decline, it is recommended that the trough be equipped with a height-adjustable support which provides means for tilting or declining the trough at any desirable angle to the horizontal, say up to 45°, more practically from 10° to 25° to provide a desirable gradient.

A preferred embodiment of the invention includes the step, and necessary means, to collect the molten bath falling through the mesh screen and to convey or to provide a means for it to flow on to a surface where it deposits and solidifies for subsequent disposal or reuse. This embodiment of the invention encompasses deposition of bath on either a portable surface mounted as on rollers, skids, wheels or the like for conveniently periodically transporting the solidified bath or on a continuously moving conveyor of some sort upon which the bath solidifies and is subsequently scraped, jarred, cracked and dislodged, or dissolved therefrom. One expedient is to have raised dividing edges on the platform forming convenient sized blocks of solidified bath for handling.

Some of the oxides and higher-melting metal bits, if any, as aforementioned, contained in the magnesium-bath-sludge mixture, remain undissolved and unmelted and are too large or possess other properties that prevent their passing through the wire mesh screen required by the invention. A preferred embodiment of the invention includes a second but coarser sieve or grating positioned so that the molten magnesium from which bath has been removed passes onto it, having openings of at least about 2.60 millimeters but less than about 5.60 millimeters through which the molten magnesium readily passes but on which are retained the sludge particles of MgO and the like. These openings correspond roughly to a screen size of from about 3½ to about 7½.

DESCRIPTION OF THE DRAWING

FIG. 3 is an elevational view of a simplified form of the invention.

Figure 1:
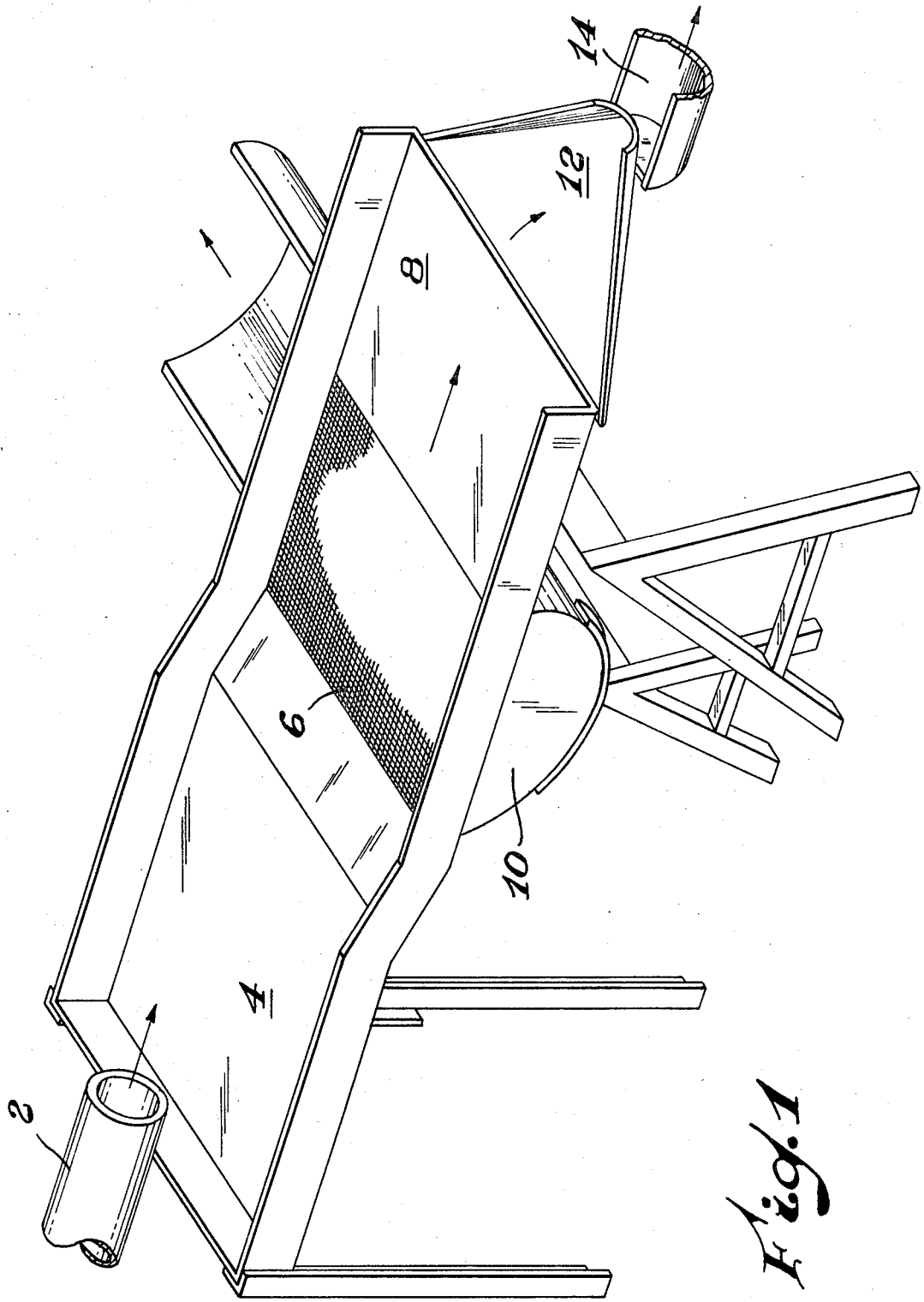
FIG. 1 is a diagrammatic or schematic view of one embodiment of the invention.

Details of the drawing follow. Looking first at FIG. 1:

Intake pipe 2 supplies molten magnesium metal intermixed with bath and some sludge previously received from an electrolytic cell. The mixture passes from 2 onto the relatively smooth preferably declining surface 4 along which the mixture moves, the heavier bath tending to stratify in a layer beneath the metal. The then somewhat stratified metal and bath moves onto wire mesh screen 6 (of from about 8 to about 20 mesh size). Bath passes downwardly through the spacings in the mesh but the surface tension, or tendency to cohere, of the magnesium metal prevents its passing through the spaces so that it moves across the sieve onto and along declining surface 8.

The molten bath falls into open-topped conduit 10 which is preferably slightly declined. The declination aided by the head of bath causes it to flow in the direction of declination toawrd the open end, as shown by the arrow. The molten magnesium flows from 8 into collecting funnel 12 which directs it into conduit 14 whereupon it is passed to the casting furnace or other molten metal storage (not shown). A basket having a sieve bottom of a size to collect the sludge particles, positioned between 12 and 14, can be used if desired.

Figure 2:
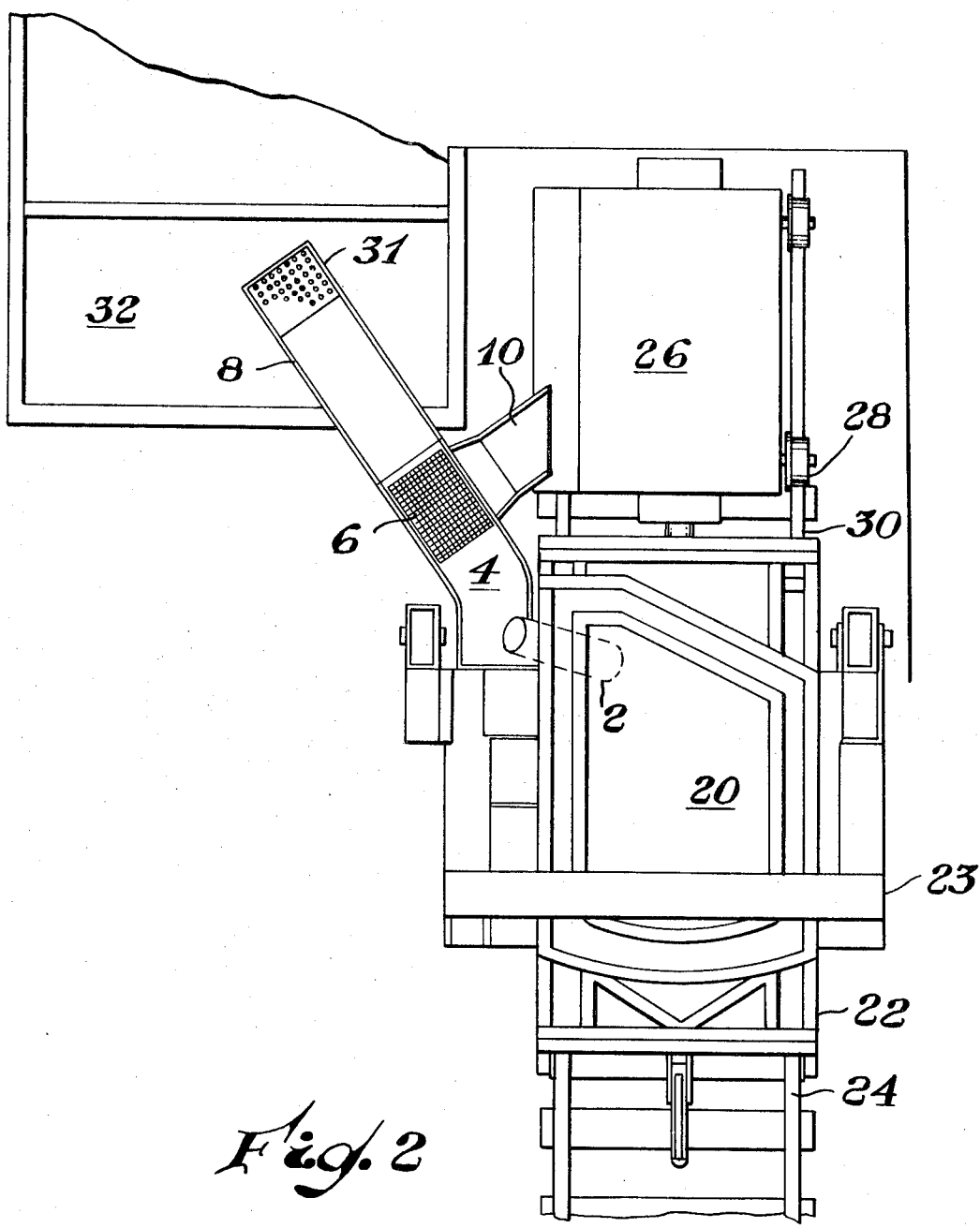
FIG. 2 is a plan view of the apparatus of the invention including the preferred sludge disposal means of undissolved or unmelted particle removal.

Looking next at FIG. 2 wherein comparable parts have identical numbers to those used in FIG. 1:

Magnesium crucible 20 is shown mounted on carriage 22 which moves, when propelled, along track 24. 22 can be tipped for receiving and discharging the molten Mg-bath-mixture by manipulation of tilting mechanism 23. The magnesium-bath-mixture leaves the crucible through pipe 2 which guides it to the plane surface 4 from whence the mixture moves onto sieve 6. Molten bath falls through the spaces of 6 into open topped conduit 10 along which it flows to deposit on freeze-pan 26. Here the bath solidifies into a layer which may have provision to form blocks for easier disposal. Pan 26 is mounted on rollers 28 which run on track 30 which may be an independent track or a continuation of track 24. In either case, crucible 20 is usually brought into position from the same direction as that direction to which the freeze pan is taken out for disposal of the solidified bath. The purified molten magnesium passes on from sieve 6 and flows along surface 8 either directly to reservoir 32 or optionally into basket-shaped removable sieve 31, the magnesium metal passing down through the holes therein into furnace reservoir 32. Solid sludge particles, largely MgO, that had been carried along in the molten magnesium are retained in basket-shaped sieve 31. They being relatively of small volume, sieve 31 need only be removed and cleaned after prolonged use. The use of sieve 31 is clearly optional and not necessary to the practice of the invention. From 32 the molten metal can be drawn from the holding furnace through a convenient controlled-flow outlet (not shown) for casting into molds. The molds usually are brought into position, for receiving the molten magnesium for casting, on a conveyor, e.g. a monorail from which the individual molds are suspended (not shown).

FIG. 3 is an elevational view of a version of the invention similar to that shown isometrically or schematically in FIG. 1 except the bath-collecting means 36 and the magnesium collecting means 38 are further simplified from those represented by items 10 and 14, respectively, of FIG. 1.

PRACTICE OF THE INVENTION

As aforesaid, magnesium metal is hand-dipped, mechanically sucked, or otherwise removed from an electrolytic cell, the metal having adhered thereto and intermixed therewith up to 20% by weight salt bath comprising magnesium chloride and other metal halides and containing also particulate sludge, largely MgO. The salt bath must be removed; it is highly desirable that the sludge be removed. The invention accomplishes these objectives in an unexpectedly efficient, convenient, and inexpensive manner by employing the apparatus of the invention and applying the method of the invention which comprises passing it over an 8 to 20 mesh wire mesh screen, allowing time sufficient for the heavier molten bath to slip past and beneath the molten metal and through the spaces of the screen to a bath-collecting means while the metal, having coalescent or cohesive force greater than the pull of gravity plus any adhesive force between it and the metal of the screen, passes on into a molten magnesium storage facility, preferably passing enroute to storage through a metal screen having holes small enough to collect the sludge particles.

EXAMPLES OF THE INVENTION

The following examples were conducted in accordance with the practice of the invention. An apparatus substantially like that of the drawing was used.

A trough, approximately 6 inches wide and about 22 inches long, was provided with a screen 6 inches wide (the width of the trough) and 5 inches long as a portion of the bottom which corresponded to item 6 of the drawing. A known weight of electrolytically produced molten Mg metal and adhering molten salt bath mixtures of which the latter comprised from 1% to 20% by weight were caused to flow, in successive tests along the trough, onto screen 6, and thence into a heated collecting holding furnace. The slope of the screen was varied from 4" to 8" in 22". The treated molten magnesium was analyzed for adhering salt bath. The amount of bath present was then added to the weight of removed solidified bath to provide the total weight of bath originally present. The percent bath removed was calculated therefrom. The flow rate across wire screen 6 was about 150 pounds/minute.

The table below shows the more important conditions and results of the examples.

SCREEN SPECIFICATION

| Example number: | Strands of steel wire per inch | Wire diameter, mm. | Spacing between wires, mm. | Open area in percent of area |
|---|---|---|---|---|
| 1 | 8 | 0.710 | 2.46 | 60.2 |
| 2 | 10 | 0.640 | 1.91 | 56.3 |
| 3 | 12 | 0.584 | 1.52 | 51.8 |

The molten magnesium recovered from mixtures of bath and magnesium showed that an average 97% of the adhering bath was removed from mixtures comprising between 1% and 20% by weight bath. As would be expected, the percent bath, based on the bath initially present was less. For example retreated molten magnesium having only a fraction of a percent of bath present showed only about half of that removed according to the invention.

Less than 3% molten bath adhering to the magnesium is clearly satisfactory for most uses and a marked improvement over currently produced magnesium metal. If desired, of course, the once treated metal can be again passed over the wire screen in accordance with the invention. There is virtually no lost metal by practicing the invention.

In contrast to the above examples, conventional practice, the molten mixture of bath and magnesium is poured into the holding furnace where provision must be made for a considerable holding period. During that period, a substantial portion of the bath gradually drains to the bottom of the furnace to form a stratum or layer. After such settling, the layer is pumped out.

There are a number of disadvantages of conventional practice:

(1) The bath is not sufficiently removed and the casting process and cast metal are adversely affected;
(2) Turbulence created by the pump is unavoidable and the entire layer of bath cannot be removed and invariably some magnesium is removed and lost;
(3) The temperature of the molten magnesium undesirably drops during the bath separation;
(4) The expense of continued heating of the body of magnesium to maintain it molten, the expense of pumping out the bottom layer of bath and disposal thereof at this stage, and the expense of delay and added labor are appreciable indeed in contrast to the practice of the invention.

Having described my invention, what I claim and desire to protect by Letters Patent is:

1. The apparatus for the separation of molten magnesium from a mixture of molten magnesium and molten bath comprising, in combination, (1) a supply means for the mixture, (2) a conduit leading from the supply means having at least a part of the bottom thereof consisting of a wire mesh screen of a material having a higher melting point than magnesium and substantially unreactive with molten magnesium and said bath, said screen having openings of from between about 2.46 mm. to about 0.84 mm., the temperature being maintained above the melting point of magnesium, the mixture being caused to flow onto said screen and the molten bath separated from the molten magnesium by the bath passing through the spaces in the mesh screen and the magnesium metal being caused to flow on over it, (3) a disposal means for the thus separated bath and (4) a receiving means for the thus treated magnesium.

2. The apparatus of claim 1 wherein the receiving means is provided with a heating means adequate to maintain the magnesium in a molten state.

3. The apparatus of claim 1 wherein said wire mesh screen is made of steel and has from about 3 to about 8 strands per lineal centimeter, each strand having a diameter of from about 0.84 to about 0.42 millimeter, said strands being spaced apart so as to provide openings therebetween of from about 2.46 millimeters for the largest strands to about 0.84 millimeter for the narrowest strands.

4. The apparatus of claim 1 wherein the disposal means for the separated bath includes a trough having the lead end thereof positioned beneath said screen and the outlet end thereof terminating over a cooler surface having raised dimensional outlines whereby the bath is solidified into slabs or blocks of convenient handling size.

5. The apparatus of claim 4 wherein the platform is mounted on skids or rollers.

6. The apparatus of claim 1 wherein a removal basket-shaped vessel having a relatively coarse screen in the bottom thereof, having openings of a size from the range of between about 2.60 to about 5.60 millimeters, is positioned between the bath-removing wire mesh screen and the molten magnesium storage means whereby the molten magnesium is caused to pass through said coarse screen to the storage means and particulate sludge is retained thereon for subsequent disposal.

7. The apparatus of claim 1 wherein said conduit containing said wire mesh screen is declined from the entrance end at an angle up to about 45° from the horizontal.

8. The method of separating molten magnesium from a mixture of molten magnesium and molten salt bath comprising $MgCl_2$ adhering thereto which method comprises passing the mixture onto a wire mesh screen made of a material having a higher melting point than magnesium and substantially unreactive with molten magnesium and the molten salt bath, the screen being selected from a mesh size having openings of from about 2.46 mm. to about 0.84 mm., whereby molten bath passes through the spacings in the screen and is disposed, and the molten magnesium passes on and into a receiving reservoir.

9. The method according to claim 8 wherein the so-treated molten magnesium, passed on to said reservoir, is continued to be heated to a temperature above its melting point until subsequently cast.

10. The method according to claim 8 wherein the molten bath passing through said screen is recovered by a collecting means consisting essentially of a trough having the lead end positioned beneath said screen and the outlet end terminating over a cooled platform whereby the so-separated sludge solidifies into blocks.

11. The method according to claim 10 wherein said platform is mounted on skids or rollers.

12. The method according to claim 8 wherein the molten magnesium passing across the wire screen and continuing to storage is passed, prior to entering said storage reservoir, into and through a removable basket provided with a relatively coarse screen in the bottom thereof having openings of from between about 2.60 millimeters to about 5.60 millimeters therein, whereby particulate solid material in the molten magnesium, including MgO bits, is collected on the screen.

13. The method according to claim 8 wherein said mixture and, after separation of molten bath therefrom, the so-treated magnesium, is passed along a decline to said storage reservoir, thereby facilitating more rapid movement thereof.

References Cited

UNITED STATES PATENTS

| | | | |
|---|---|---|---|
| 3,420,658 | 1/1969 | Reding | 75—67 |
| 3,146,094 | 8/1964 | Hannan | 75—67 |

L. DEWAYNE RUTLEDGE, Primary Examiner

P. D. ROSENBERG, Assistant Examiner

U.S. Cl. X.R.

75—67; 209—397

PO-1050
(5/69)

UNITED STATES PATENT OFFICE
CERTIFICATE OF CORRECTION

Patent No. 3,734,718     Dated May 22, 1973

Inventor(s) W. L. Bradshaw

It is certified that error appears in the above-identified patent and that said Letters Patent are hereby corrected as shown below:

Column 4, line 2, change "toawrd" to --toward--.

Column 6, line 61 (in Claim 8), after the word "disposed" add --of--.

Signed and sealed this 1st day of October 1974.

(SEAL)
Attest:

McCOY M. GIBSON JR.
Attesting Officer

C. MARSHALL DANN
Commissioner of Patents